United States Patent [19]

Bowen

[11] Patent Number: 5,502,460
[45] Date of Patent: Mar. 26, 1996

[54] ERGONOMIC LAPTOP COMPUTER AND ERGONOMIC KEYBOARD

[76] Inventor: James H. Bowen, 12190 Richland Dr., Catharpin, Va. 22018

[21] Appl. No.: 284,108

[22] Filed: Aug. 2, 1994

Related U.S. Application Data

[63] Continuation-in-part of Ser. No. 67,015, May 26, 1993, abandoned.

[51] Int. Cl.$^6$ ..................................................... G09G 5/00
[52] U.S. Cl. ........................... 345/168; 400/489; 400/718
[58] Field of Search .................................. 345/168, 169; 400/82, 472, 485, 486, 488, 489, 682, 715, 716, 717, 718; 341/21, 25

[56] References Cited

U.S. PATENT DOCUMENTS

| | | | |
|---|---|---|---|
| 3,940,758 | 2/1976 | Margolin | 340/337 |
| 4,378,553 | 3/1983 | McCall | 340/365 |
| 4,509,873 | 4/1985 | Ryan | 400/489 |
| 4,546,947 | 10/1985 | Gesten | 248/442.2 |
| 4,597,681 | 7/1986 | Hodges | 400/488 |
| 4,661,005 | 4/1987 | Lahr | 400/489 |
| 4,739,451 | 4/1988 | Kuba | 361/394 |
| 5,067,834 | 11/1991 | Szmanda et al. | 400/489 |
| 5,073,050 | 12/1991 | Andrews | 400/82 |
| 5,119,078 | 1/1992 | Grant | 340/711 |
| 5,137,384 | 8/1992 | Spencer et al. | 400/489 |
| 5,141,343 | 8/1992 | Roylance et al. | 400/472 |
| 5,187,644 | 2/1993 | Crisan | 361/393 |
| 5,228,791 | 7/1993 | Fort | 400/489 |
| 5,230,074 | 7/1993 | Canova, Jr. et al. | 395/750 |

FOREIGN PATENT DOCUMENTS

| | | | |
|---|---|---|---|
| 4108096 | 8/1992 | Germany | B41J 5/10 |
| WO83/00308 | 2/1983 | WIPO | B41J 5/10 |
| WO92/15083 | 9/1992 | WIPO | G09G 3/02 |
| WO92/18996 | 10/1992 | WIPO | H01H 13/70 |

OTHER PUBLICATIONS

Apple Computers, Inc. data sheet "Adjustable Keyboard", 1992.

Marquardt Switches & Health Care Keyboard Co., article in P.C. Magazine, May 25, 1993 "Ergonomics of Inputs".

*Primary Examiner*—Richard Hjerpe
*Assistant Examiner*—Regina Liang
*Attorney, Agent, or Firm*—Whitham, Curtis, Whitham & McGinn

[57] ABSTRACT

A keyboard to be used on an operators lap that separates to relieve stress in an operators neck and wrists. The keyboard has a flat surface between the keyboard sides, so while being held on a persons lap, will hold reference material and a second party pointing device that can be used with either hand to keep the neck straight. A separable keyboard that is only electrically connected, so each side of the keyboard can be operated on completely different surfaces. A notebook computer with keyboards that open up on each side so the operators hands are separated. The keyboards can slide closed or fold closed, and when folded, interleave so full size keys can be used and facilitate a more compact design, and can be unfolded so the keyboards slant down below the computer to centralize the computer on a persons lap, and reduce the twist between the hand and wrist. The keyboard includes a means to turn all visual indication of computer operation off to be used in a secure no light area with a speaker to give verbal enunciated messages in response to the keyboard and from a computer.

50 Claims, 10 Drawing Sheets

ERGONOMIC LAPTOP COMPUTER AND ERGONOMIC KEYBOARD

CROSS REFERENCE TO RELATED APPLICATION

This application is a continuation-in-part of the application having U.S. patent application Ser. No. 08/067,015, now abandoned, filed on May 26, 1993, the complete contents of the co-pending application being herein incorporated by reference.

BACKGROUND OF THE INVENTION

1. Field of the Invention

The present invention generally relates to keyboards and computers to relieve an operators cumulative trauma disorders (CTD) and related musculoskeletal conditions, and to provide an integral activity area in the middle of the keyboard for at least reference material, hand writing, track ball and mouse type input pointing devices while holding the keyboard on a persons lap or other surface that is not necessarily normal to the host.

2. Description of the Prior Art

The majority of keyboards disclosed or on the market today are of a rectangular shape with a plurality of horizonal rows of keys, whether it be a Qwerty, Dvorak or other custom keyboards.

There are stands that are being marketed today to hold reference material that are positioned to either side of the keyboard. Also there are mouse pads and track balls on the market that are also positioned to either side of the keyboard. There are also computers that emit a tone or a click to give audible feedback to the operator that a key has been depressed.

There are laptop computers on the market with a standard type of keyboard heretofore mentioned. Some have a track ball in the center of the computer in front of the keyboard that the operator must reach across to input data with the keyboard.

Keyboard entry is now being studied to relieve CTDs relating to the angle of the hand when typing. If the hand, wrist and forearm were straight as the input person operated the keyboard then the stress would not be in the wrist caused by the approach angle of the hand to the keyboard.

Some new keyboard designs have focused on steps toward relieving CTDs by angling the input device from the top center about five degrees to lessen the angle of the wrist when imputing data.

One such device has been disclosed in U.S. Pat. No. 5,119,078, Grant. It has been described as being a "shallow v-shaped and a center-peak that permits the user to function with a relatively straight hand-wrist angle".

A second device that is being marketed by Apple Computer is their "Adjustable Keyboard". This keyboard is very similar to the Grant keyboard with the exception that the keyboard is split in the middle and the angle of the keys are adjustable from zero degrees to about five degrees. The adjustment is made from a pivot in the top center of the keyboard keeping both sides of the keyboard mechanically attached.

Another such device is disclosed in U.S. Pat. No. 4,661,005, Lahr. This keyboard device is rigidly held to a desk top and is adjustable in width from a split in the middle. When in the open position a separate copy holder can be mounted to the desk top. The halves of the keyboard can be mounted to the sides of the computer and then be removed to be stored in another section of the computer for transporting.

Disclosed in a U.S. Pat. No. 4,739,451 Kuba, is the ability to have a keyboard made up of different sections in particularly a phone, numeric key pad and the QWERTY section.

SUMMARY OF THE INVENTION

To date the prior art has started to address the problem of the hand, wrist and forearm being at an angle causing CTDs.

It is therefor an object of this invention to address more of the ergonomic issues by having more versatile keyboards and computers with integral features that can be used in a more relaxed atmosphere in an operators lap or surface other than the surface normal to the host device. Wherein the integral keyboard with an activity area between two sections of the keyboard is split in a location that is optimized for the left and right hand for alpha data entry are only electrically connection to the host device, by which this electrical connection could be wires or transmitted and received by FM or other means, and the computer, keyboard and integral activity area keyboard slides apart or unfolds horizontally to maintain a more straight wrist position when inputting data and to keep a more perpendicular alignment of the arm and keyboard, and the arms parallel to each other.

A further object of this invention is to provide a keyboard that is fixed in an separated position that will address the majority of users with a integral activity area and reference material holder.

A further object of this invention is to provide a keyboard whereas the different sides that are separated and only electrically connected to be used on irregular surfaces or when it is more comfortable to have the two sections of the keyboard not in the same plane.

A further object of this invention is to provide in the activity area a means to hold reference material that is being used by the input person. Having the reference material between a persons hands keeps the head angle perpendicular to the input device, making a more normal position rather than having to look at different locations for said reference material. This also allows for the reference material to be held by the keyboard when the user is using the keyboard on their lap or other surfaces than the host device.

A further object of this invention is to provide in the activity area a location for an input pointing device that is not necessarily attached to the keyboard. This allows for a pointing device that could be from a different manufacturer to be used on the keyboard when the keyboard is being used on their lap or other surfaces than the host device. This also allows for the pointing device to be operated with the left and right hand.

When operating a battery powered laptop computer on a persons lap the laptop must be out near the knees in order to have the persons hands close enough together to operate the keys, or the person must have a very acute angle in their wrist. Therefore it is a further object of this invention to have the keyboard unfold or slide apart while remaining electrically and mechanically connected and offer the keys on the side of the laptop computer to relieve the CTDs and to make the computer more compact.

A further object of this invention is to have the laptop computer or keyboard operate with the keyboard separated or in the closed position.

A further object of this invention is to provide an ear phone or speaker on the keyboard or laptop computer for audible verbal enunciated responses of a key being depressed or messages from the computer to be used by a person that has a vision impediment, or when lower power is wanted by turning off the computer display.

Briefly, this invention contemplates having a keyboard that separates in a lateral opposing direction. Further the sections would slide or hinge apart to separate the keyboard. When the keyboard slides apart wires connect the two sides in a wire run, or flex around the hinge when opened. When the two sides are apart an integral activity area support for a pointing device and a integral reference material holder can be provided.

BRIEF DESCRIPTION OF THE DRAWINGS

The foregoing and other objects, aspects and advantages will be better understood from the following detailed description of a preferred embodiment of the invention with references to the drawings, in which.

DETAILED DESCRIPTION OF THE PREFERRED EMBODIMENT OF THE INVENTION

Figure 1:
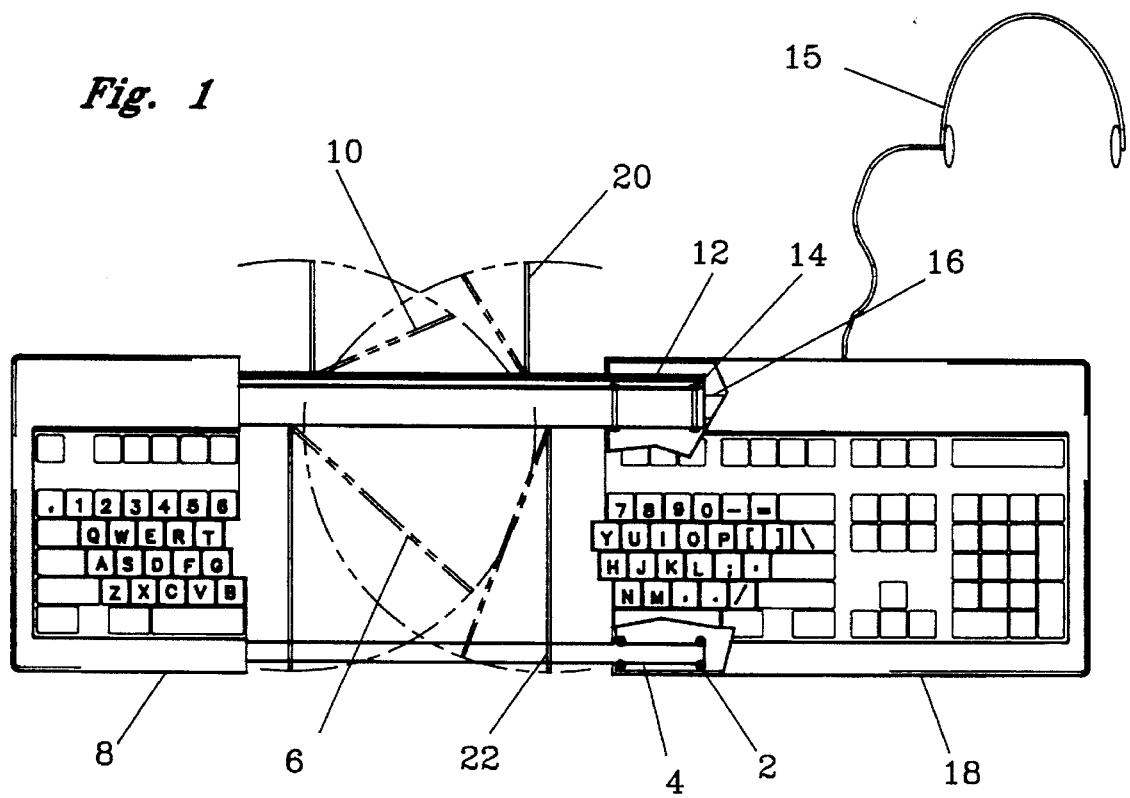
FIG. 1 is a plan view, with the keyboard separated, of the keyboard with an integral adjustable reference material holder and an integral activity surface support in the middle of the keyboard and an ear phone in accordance with the teachings of this invention.

Referring now to the drawings, in which the same reference numeral indicates the same element in the various figures, FIG. 1 shows the keyboard in an open position in which the left side 8 of the keyboard is connected to the right side 18 by two slide arms 4 and 12. The slide arms 4 and 12 are affixed to left side 8 and slide through guides 2 and upper rear guides 14 that are affixed to the right side of the keyboard. Slide arm 12 has an opening down the center axis that is used as a wire run for wires 16 that connect the two halves of the keyboard. The activity surface supports 22 rest on the slide arm 4 and pivot from slide arm 12 in the arc 6 formed by said support 22. The reference material holder 20 pivots from slide arm 12 in the arc 10 formed by said holder 20. Small and large computers all consume power and the display is one of the components that uses a good portion of that power. The ear phones 15, in which could be a speaker, are plugged into the keyboard 18 and are to be used when the host display can be turned off. The turning off and on would be through the keyboard keys utilizing the circuit shown in the block diagram in FIG. 10 or in the case of lower power, a switch could be used. This turning on and off could be at times but not limited to, word processing, answering verbal questions via modem or voice lines, when in low or non lighted areas, when a military person is on the front lines, by a person that has a vision impediment, to save power or in times that the computer unattended, like waiting for a FAX. The response through the ear phones could be, but not limited to, actual verbal letters, correcting your spelling of what you are writing and verbal enunciation of the completed typed word. It should be appreciated that this enunciation message could be in any language and a chip set for the speech electronics can be purchased from various manufacturers.

Figure 2:
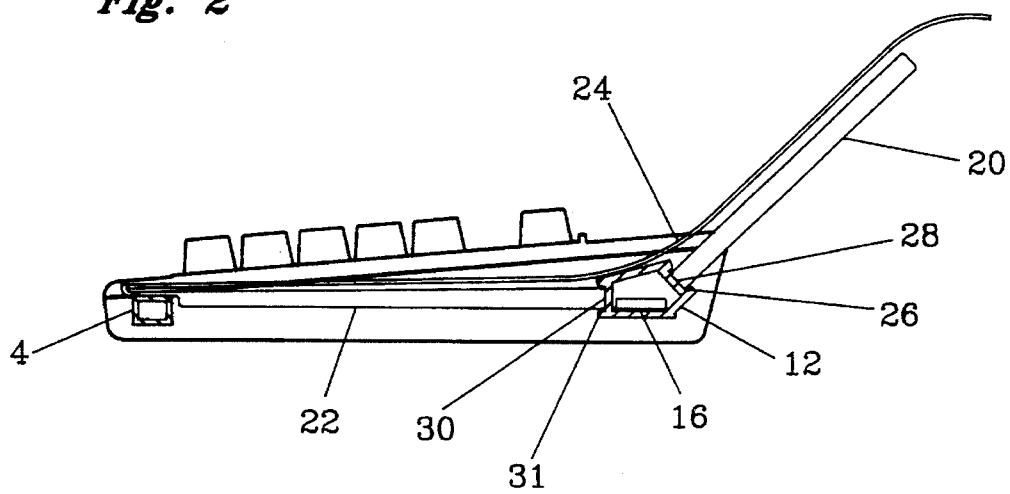
FIG. 2 is a section view through the activity area showing the reference material holder and activity surface support pivot points, channel where said holder and support are stored in the closed position and the interconnecting wire and wire run in accordance with the teachings of this invention.

FIG. 2 shows reference material holder 20 and the pivot pin 26 in the channel 28 of the slide arm 12. FIG. 2 also shows activity surface support 22 and pivot pin 31 in the channel 30 of slide arm 12. The holder 20 and support 22 in the closed position are coplanar with the outer surfaces of channel 28 and 30 respectively, so when the keyboard is closed the two sections can slide together. The wires 16 are supported in the wire run formed by rear slide arm 12 as the keyboard is extended or closed.

Figure 3:
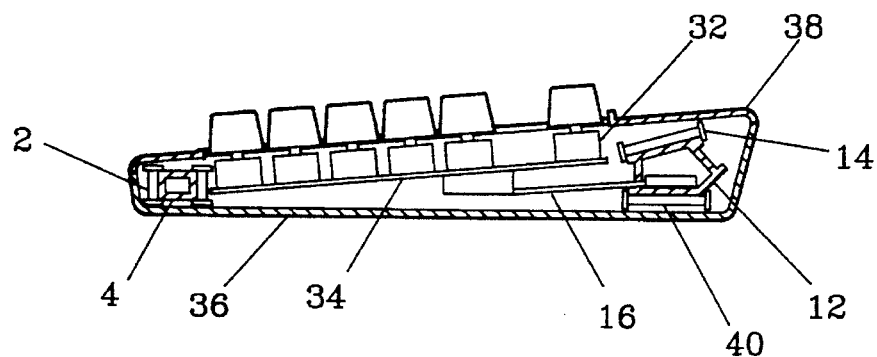
FIG. 3 is a cross section through the keyboard switches, printed wiring board and said wire run in accordance with the teachings of this invention.
Figure 4:
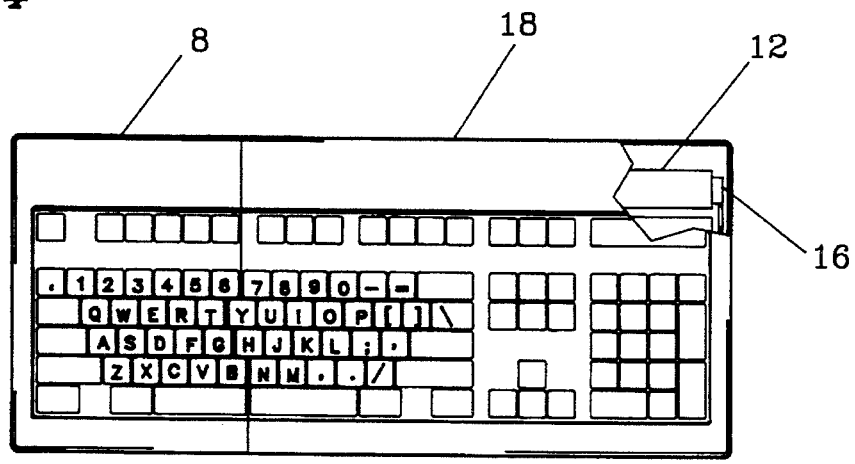
FIG. 4 is a plan view of the keyboard in the closed position and showing the said interconnecting wire protruding out of the wire run with the keyboard in the closed position in accordance with the teachings of this invention.

FIG. 3 shows the top 38 and bottom 36 of the keyboard that comprises the right side 18 of FIG. 4 and housing the key switches 32 that are connected to the printed wiring board 34. Upper guides 14 and lower guides 40 form a track that facilitates the sliding of slide arm 12. Guides 2 form a track that facilitates the sliding of slide arm 4. The wires 16 that are in the right end of rear slide arm 12 connect to printed wiring board 34 and to the left side of the keyboard.

FIG. 4 shows the left side 8 and right side 18 of the keyboard in the closed position and with slide arm 12 supporting wires 16.

Figure 5:
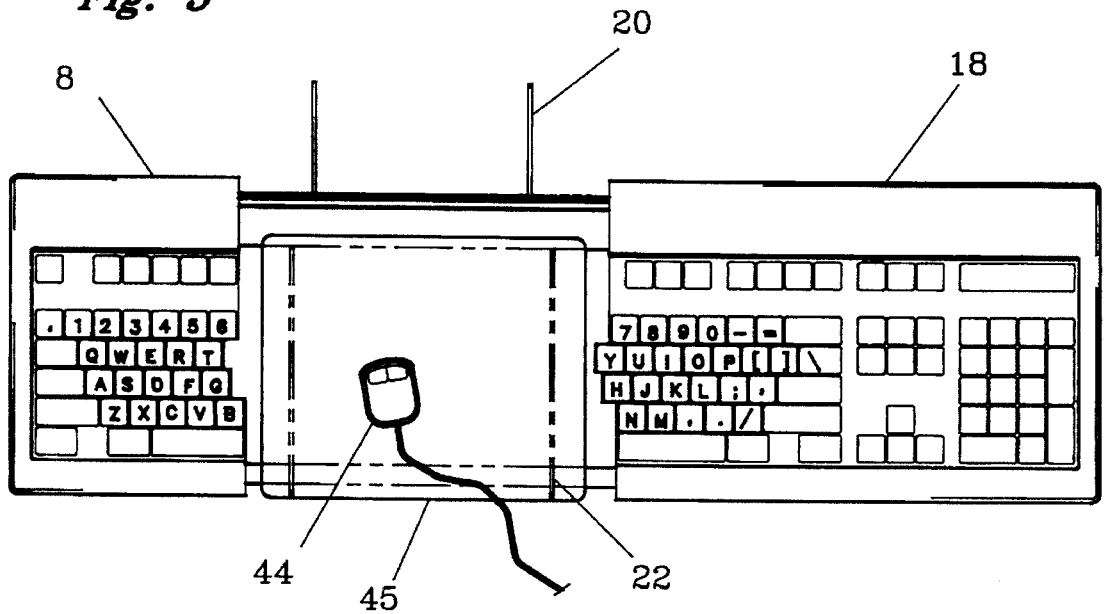
FIG. 5 is a plan view showing the keyboard in a separated position, a pointing device on an activity surface in the middle of the keyboard and the slides connecting the two sides of the keyboard in accordance with the teachings of this invention.

FIG. 5 shows a pointing device on the an activity surface resting on the supports 22.

Figure 6:
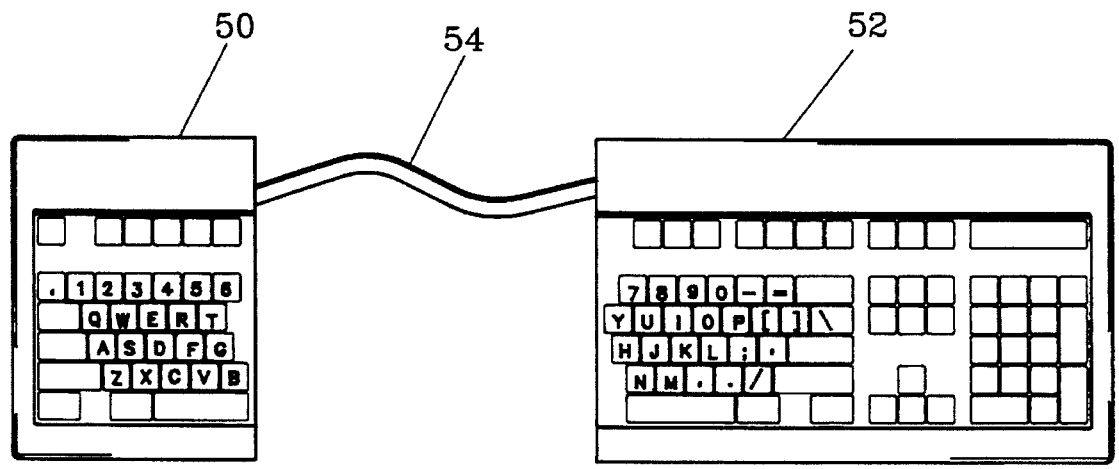
FIG. 6 is a plan view of the keyboard in a separated configuration in which the only physical connections are the wires to electrically connect the two sections of the keyboard in accordance with the teachings of this invention.
Figure 23:
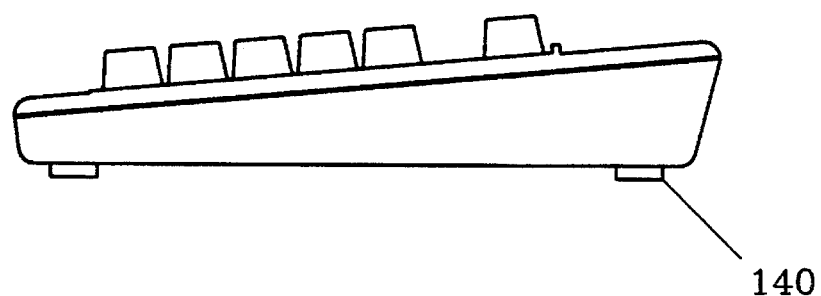
FIG. 23 is a side view of a keyboard showing mounting feet in accordance with the teachings of this invention.

FIG. 6 shows the left side 50 of a keyboard with the connection to the right side 52 is only made by the electrical connection 54. Preferably the wire is one to three feet long. The alignment of both sides of the keyboard is not critical and could be on two completely different surfaces. These surfaces could be the tops of books, computer stands, desks, desk drawers, operators lap, sleeping beds, couches, chairs, night stands, stacks of papers and the floor. One side of the keyboard could also bridge between a combination of these surfaces forming an angle due to the possible different heights of the bridged surfaces. The separation between the two sides 50 and 52 is made where the right and left hand keys are optimized for those skilled in the art of speed typing would be best accommodated. This could include but not limited to a QWERTY or Dvorak configuration of keys. This split location lets the operator touch type with their hands separated. A patent, Kuba U.S. Pat. No. 4,739,451, has a separated number pad. With the split in that location the hands must be together when speed typing. Another patent, Murphey WO 83/00308, splits in the location as the applicant's invention, but discloses being used in a track to adjust for a separation that is comfortable to the operator and has no teaching of being used out of the track. Another patent, Fort U.S. Pat. No. 5,228,791, splits in the same as the applicant's invention, but the sides of the keyboard are on stands with adjustments to position for better CTD's relief and would not, or have a teaching, operate with one keyboard side bridged between say a book two inches high and some papers one quarter inch high and the other keyboard side two feet away bridged between some papers and the corner of a desk drawer. When the person wants another piece of reference material they are free to get up, unlike trying to find a new place for the one piece keyboard. This example may seem far fetched but, as experienced, it is a way of life in a college dorm. FIG. 23 shows a side view of the keyboard in FIG. 6 with mount feet 140 that could be molded into or attached to the keyboard. These feet can be used on all of the keyboards shown. The applicant's invention is to be used directly on completely different operating surfaces. There are no holding or positioning apparatuses. So just having the mount feet or the lower surface of the mount feet to be nearest to the contact point with the surface that the keyboard is being operated on is advantageous over prior art because of less weight, cost of the extra apparatuses, the ease of use, more portable, and having a separable keyboard with no separable positional adjustments. All relevant prior art was invented to be used on or attached to a table.

Figure 7:
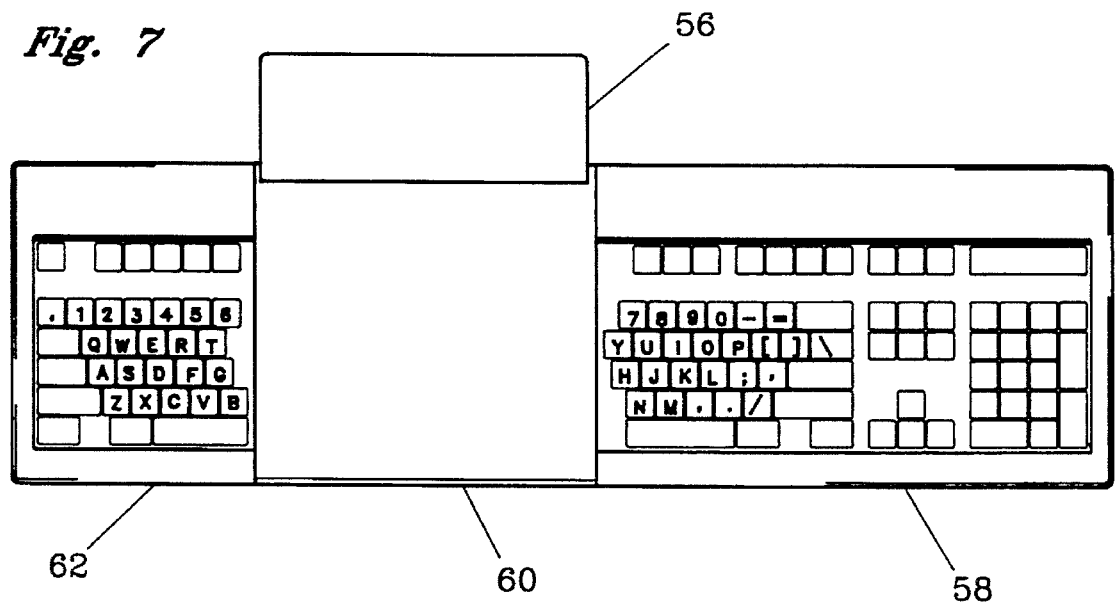
FIG. 7 is a plan view of the keyboard in a fixed position configuration in accordance with the teachings of this invention.
Figure 8:
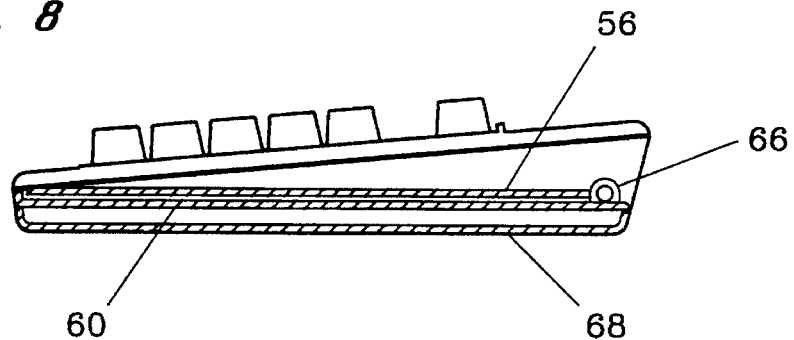
FIG. 8 is a cross section through the fixed position keyboard with a hinging reference material holder in the closed position in accordance with the teachings of this invention.
Figure 9:
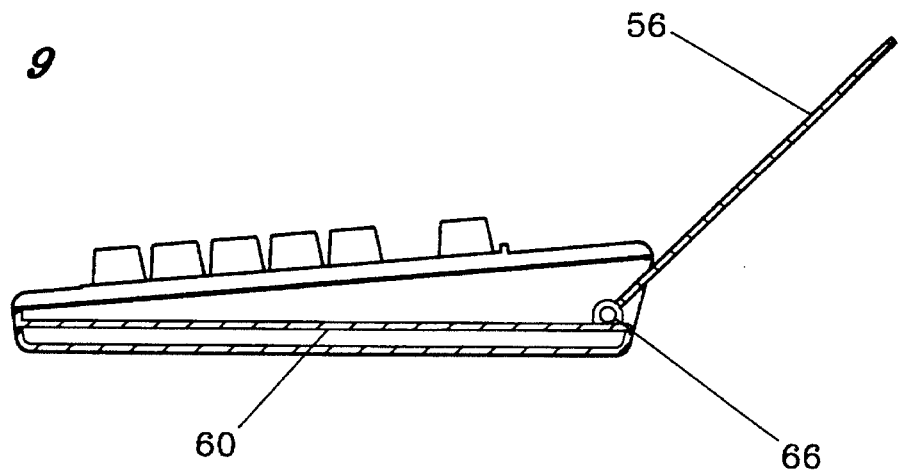
FIG. 9 is a cross section through the fixed position keyboard with the said hinging reference material holder in the open position in accordance with the teachings of this invention.

FIG. 7 shows the keyboard with the left side 62 and the right side 58 in a fixed open position with the activity surface 60 in the middle of the keyboard. The reference material holder 56 is shown in the open position and in FIG. 8 the said holder 56 is in the closed position allowing for the rear of said holder 56 to be as an activity surface area to be used for but not limited to a pointing device or hand writing. The activity surface 60 and lower cover 68 make the physical connection between the left side 62 in FIG. 7 and the right side 58 to be a fixed position keyboard. FIG. 8 and FIG. 9 show a pivot hinge 66 that allows for movement of the said holder 56.

Figure 10:
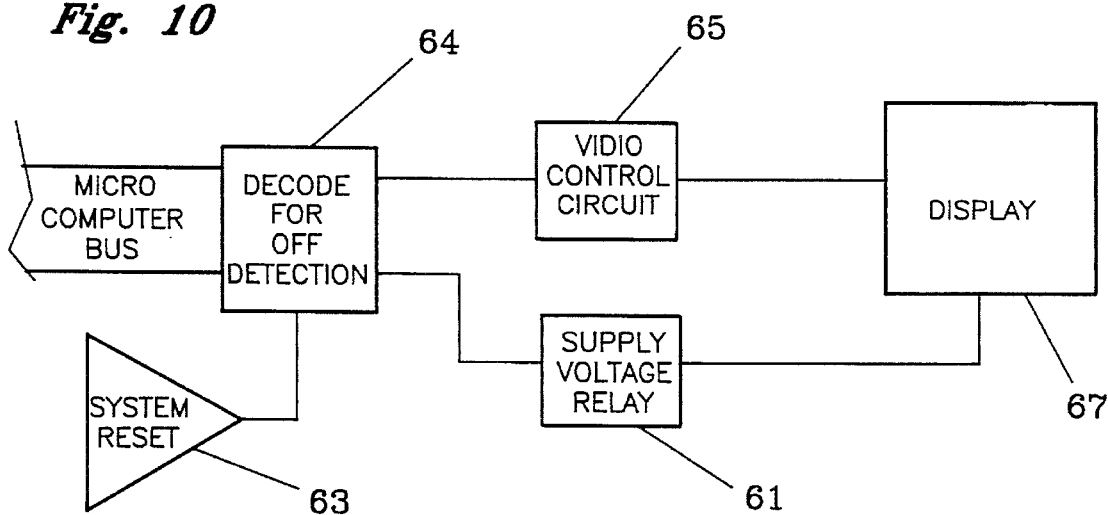
FIG. 10 is a block diagram of a circuit to turn off and on the display.

FIG. 10 shows a block diagram of a circuit to turn the display on and off. The decoder 64 monitors the computers bus waiting for a code from the keyboard to turn off the display 67. When the correct code is decoded at 64 it signals the video circuit 65 to turn of the video to the display, it should be appreciated that this video signal could be RGB, composite video or other suitable signals for controlling the monitor. The supply voltage relay 61 is connected to the computer power source and when the signal from decoder 64 is sensed it disconnects power to the monitor. The system reset 63 resets the decoder 64 to the on position thus setting the monitor back to the on state. Those skilled in the art should realize there could be another codes decoded at decoder 64 to turn the monitor to the on state without requiring a system reset. A laptop computer because of the lower voltage could replace the circuit in FIG. 10 and have a switch to disconnect the battery power to the display that would not necessarily be in the keyboard pattern of keys.

Figure 11:
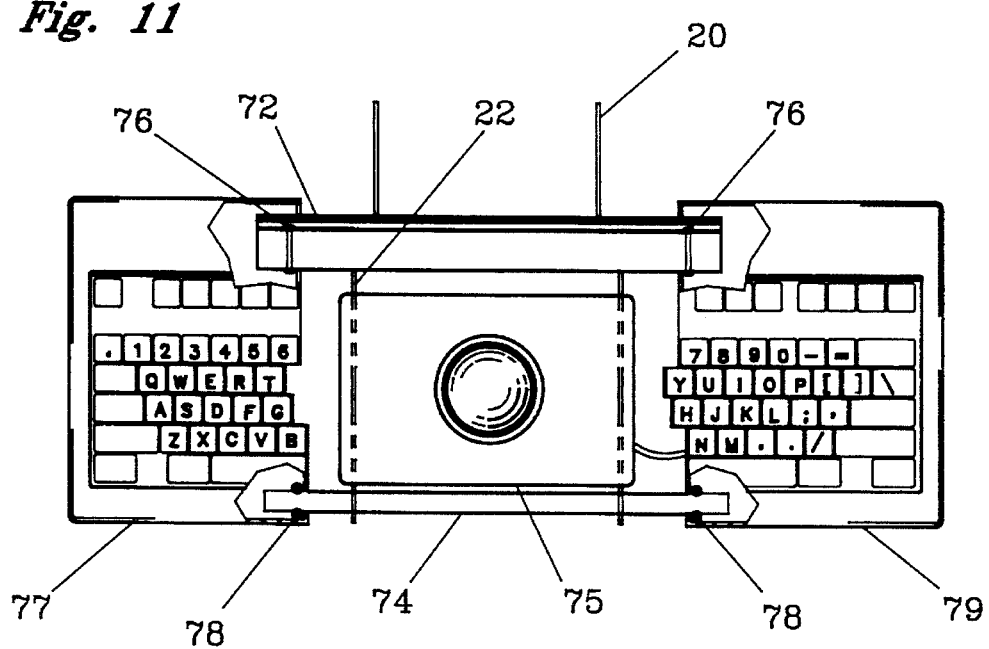
FIG. 11 is a plan view of the keyboard in the open position with a track ball type of pointing device resting on the activity surface support between the keyboard sections in accordance with the teachings of this invention.

FIG. 11 shows the keyboard with left side 77 and right side 79 are of similar size. Front slide arm 74 and rear side arm 72 slide in front guides 78 and rear guides 76 respectively. In this configuration both slide arms are free to move in either of said keyboard sides. A pointing device 75 can be placed between the two sides of the keyboard. As in FIG. 1 reference material holder 20 and activity surface support 22 fold into slide arm 72 to facilitate closing of the two sides of the keyboard.

Figure 12:
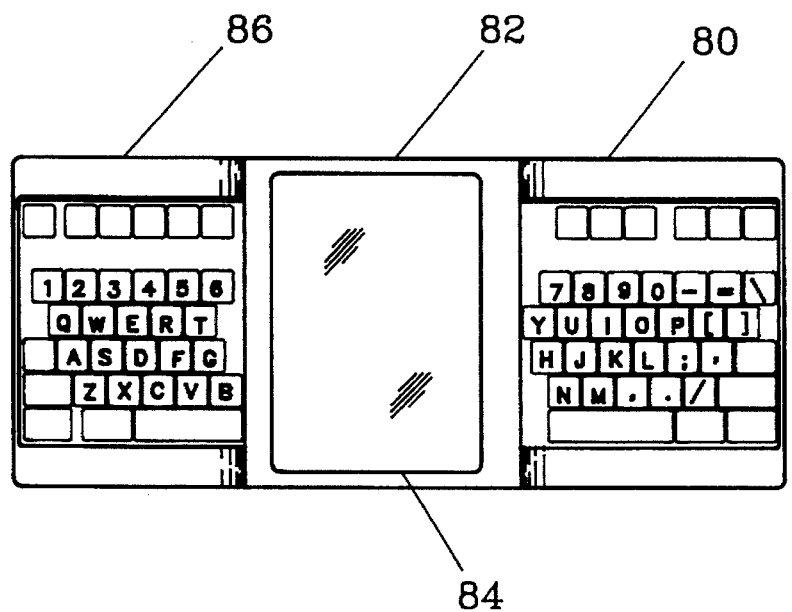
FIG. 12 is a plan view of a computer with the keyboard in the opened position utilizing the hinge type keyboard in accordance with the teachings of this invention.
Figure 13:
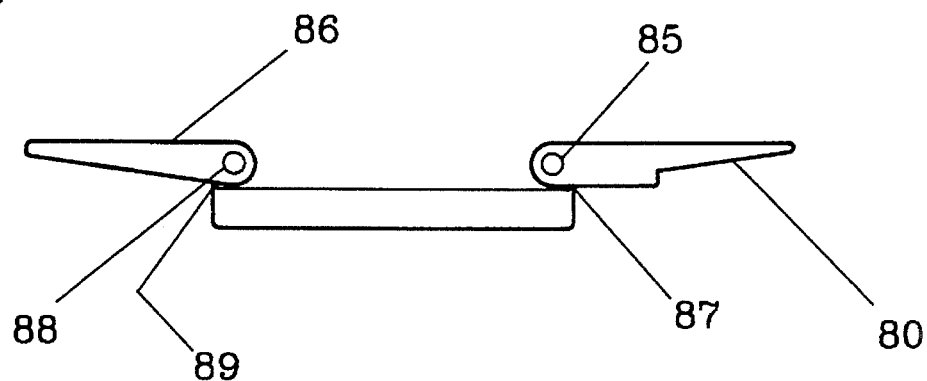
FIG. 13 is a front view of a computer with the keyboard in the opened position in accordance with the teachings of this invention.
Figure 14:
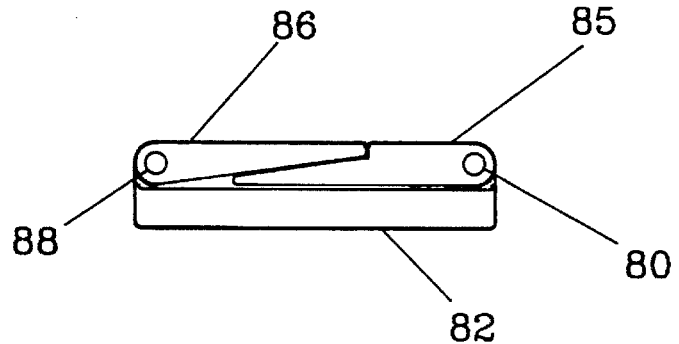
FIG. 14 is a front view of a computer with the keyboard in the closed position showing the interleaving of the two sections of the keyboard to make the computer more compact in accordance with the teachings of this invention.

The limiting factor in the width of small battery powered computers is the full size keys spaced with the normal pitch of about three quarters of an inch. FIG. 12 shows a small battery powered computer where left side 86 and right side 80 of the keyboard are hinged to either side of a computer processor 82 with a display 84. This display could be of the type as described in FIGS. 15, 16 and 17 and fold over the keyboard. The display 84 could also be touch sensitive. The sides of the keyboard pivot to the closed position with the fulcrum being hinge 88 and 85 in FIG. 13. Keyboard supports 87 and 89 are integral to computer processor 82 to set the full open position of keyboards 80 and 86. Keyboard supports 87 and 89 restrain motion of keyboards 80 and 86 so they can be easily flipped open and be self supporting without other means for support. With the interleaving of the two sides of the keyboard shown in FIG. 14 the width of the computer in the closed position can be reduced and still accommodate full size keys at the normal pitch. The interleaving position as shown in FIG. 14 is formed when right side keyboard 85 is notched to a configuration to receive left side keyboard 86 so as to overlap. The cumulative thickness at the overlap is less than the sum of the maximum individual thicknesses of the left and right side keyboards 86 and 85 respectively. Furthermore now that the keyboard is not the width limiting factor the display can be turned ninety degrees or have a change in aspect ratio to decrease the width with the keyboard in the open and closed position. This would mean that the X dimension would be less than the Y dimension.

Figure 15:
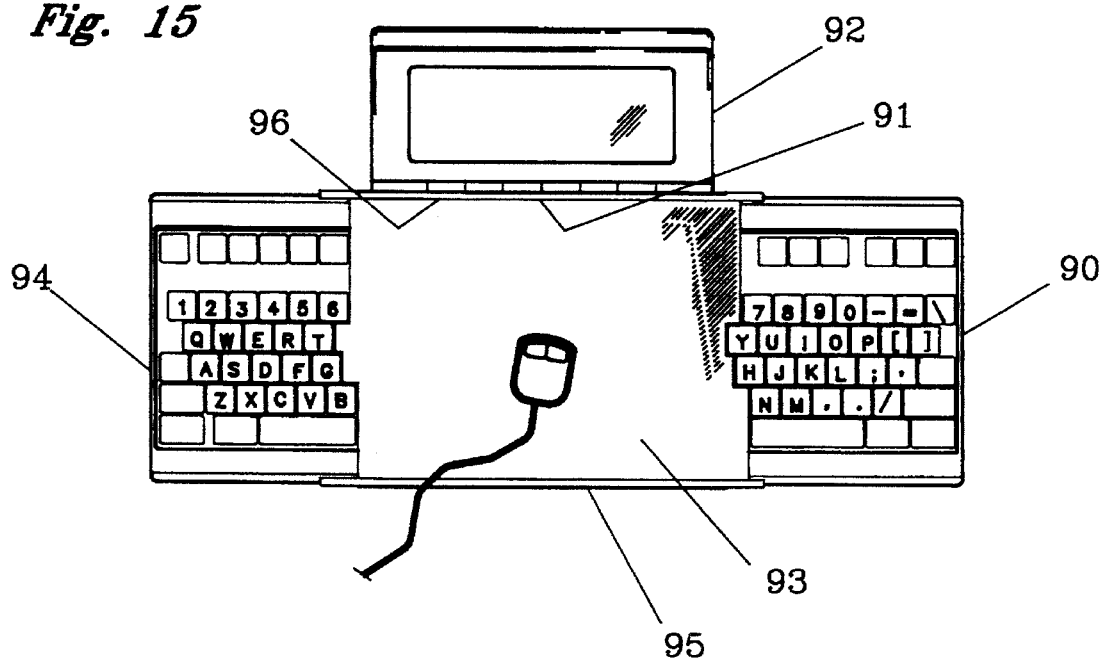
FIG. 15 is a plan view of a computer and hinged display with the keyboard that separates in a sliding motion and showing a pointing device on the activity surface in accordance with the teachings of this invention.
Figure 16:
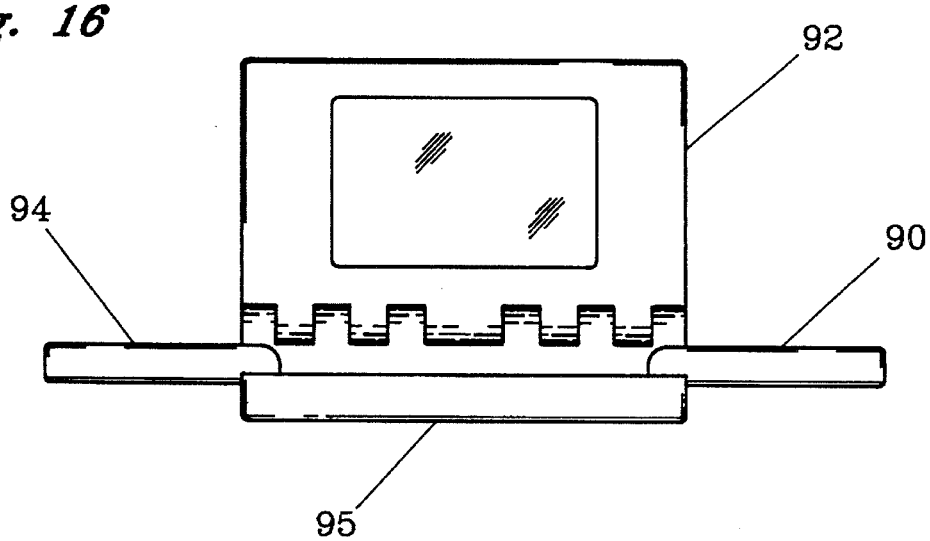
FIG. 16 is a front view of a computer and hinged display with the keyboard in a separated position in accordance with the teachings of this invention.
Figure 17:
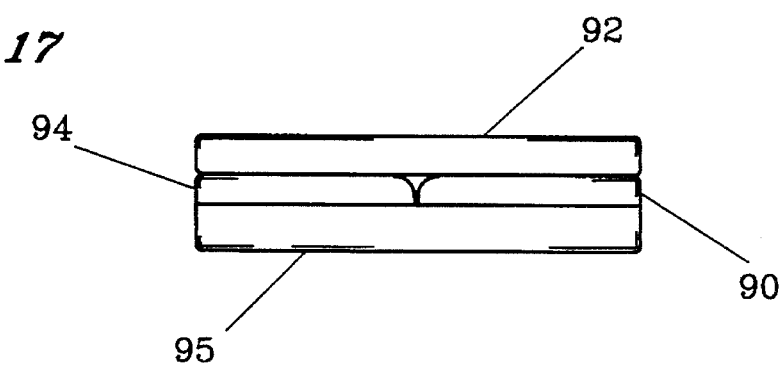
FIG. 17 is a front view of a computer and hinged display with the keyboard in the closed position in accordance with the teachings of this invention.

FIG. 15 shows a laptop computer with a computer processor 95 with left side 94 and right side 90 of the keyboard in the open position. Computer processor 95 has tracks 96 that are integral to the top of the computer that facilitate the sliding of the left side 94 and the right side 90 of the keyboard to an open or closed position. The location shown at 91 is where detents are placed to hold the keyboards in a closed position and are shown in detail in FIG. 30. These detents could be placed in multiple locations in the track 96 to hold the keyboards in various desirable positions. Display 92 can fold over the keyboard in the closed position as shown in FIG. 17. The computer can operate with the keyboard in the open or closed position. The top of computer processor 95 forms an activity surface area 93 between the keyboards for writing, a pointing device or other functions that could be preformed in that area. This area for the most part would be free of switches, holes or other features that would deter from use of the flat surface. The front view of the computer in FIG. 16 shows left side 94 and right side 90 of the keyboard and display 92 in the open position. FIG. 17 shows a front view of the computer with right side 90 and left side 94 of the keyboard and display 92 in the closed position.

Figure 18:
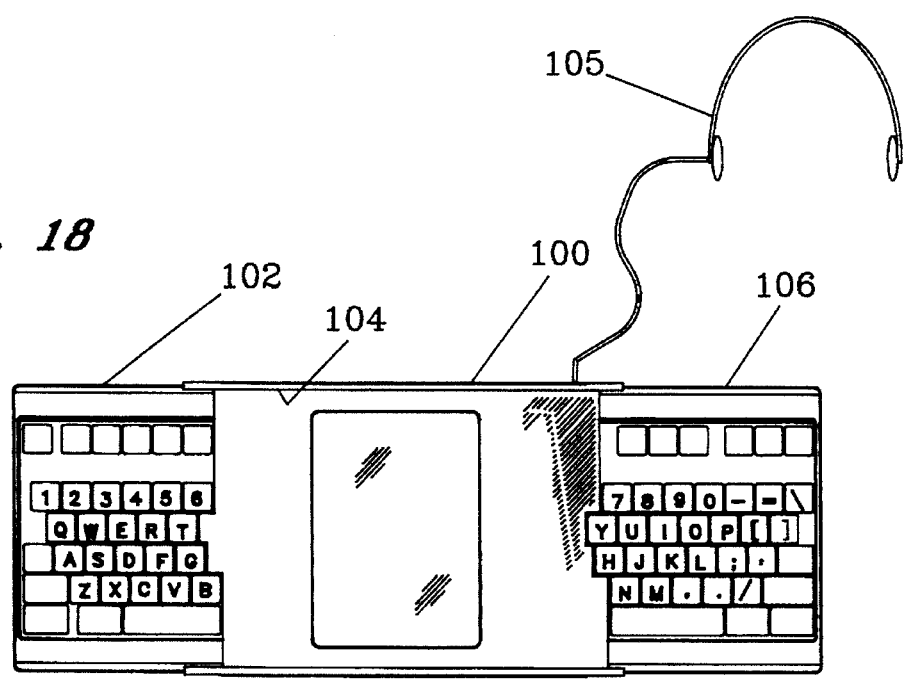
FIG. 18 is a plan view of a computer with the keyboard in an separated sliding position and an ear phone in accordance with the teachings of this invention.

FIG. 18 shows a computer with a computer processor 100 with left side 102 and right side 106 of the keyboard in the open position. The computer has tracks 104 that are integral to the top of the computer that facilitate the sliding of left side 102 and right side 106 of the keyboard to an open or closed position. Computer processor 100 can be operated with the keyboard in the open position with the display visible or in the closed position with the display covered. Ear phones 105 are plugged into computer processor 100 and are to be used when the display can be turned off, as discussed in reference to FIG. 1. The turning off and on would be through the keyboard as shown in FIG. 10.

Figure 19:
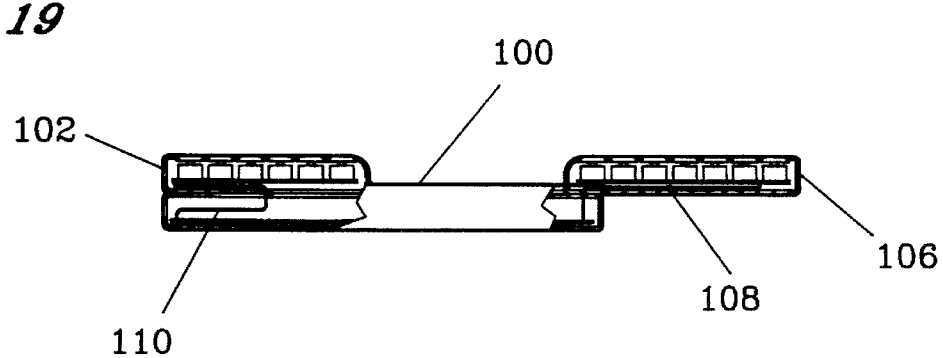
FIG. 19 is a front view of a computer with the sliding keyboard in the closed and open position in accordance with the teachings of this invention.
Figure 20:
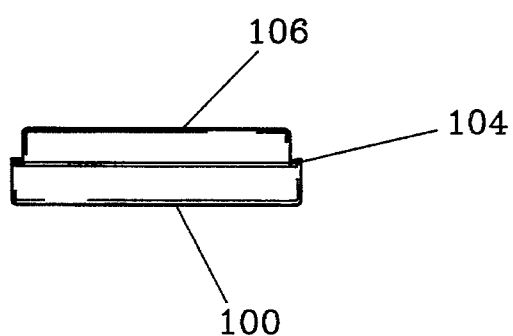
FIG. 20 is a side view of a computer with the sliding keyboard showing the sliding tracks.

In FIG. 19 computer processor 100 is shown with left side 102 of the keyboard in the closed position and right side 106 of the keyboard in an extended position. Wires for left side 110 and right side 108 are shown in the closed and extended position facilitating the operation in the open and closed position. FIG. 20 shows the right side view of the computer processor 100 and right side 106 of the keyboard with the integral tracks 104.

Figure 21:
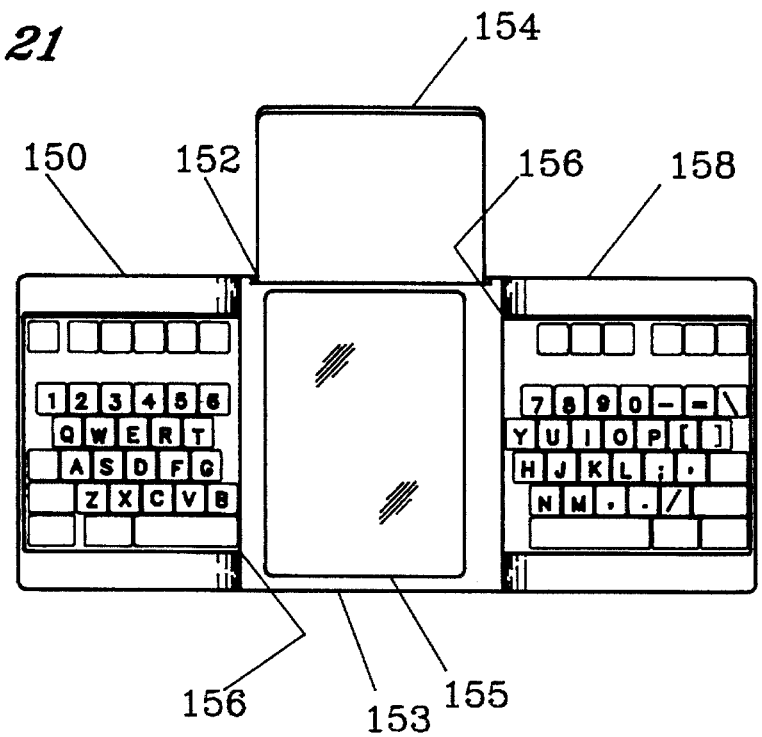
FIG. 21 is a plan view of a computer with the keyboard in the opened position utilizing the hinge type keyboard and a material holder in accordance with the teachings of this invention.
Figure 22:
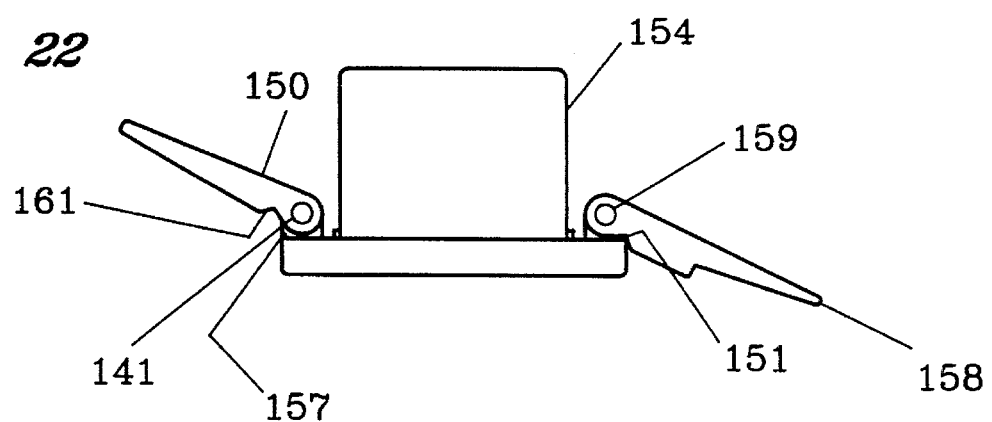
FIG. 22 is a front view of a computer with the keyboards detented in different angle positions in accordance with the teachings of this invention.

FIG. 21 shows a battery powered computer where left keyboard 150 and right keyboard 158 are hinged from either side of computer processor 153. Display 155 is in the top surface of computer processor 153. The top surface of display 155 and computer processor 153 are substantially flat and coplanar to allow for hand writing or other activities that would need a smooth surface. The display 155 could be touch sensitive. On the rear of the top surface of computer processor 153 reference material holder 154 is shown in an open position. Reference material holder 154 pivots from pivot 152 from an open position to a closed position over computer processor 153. FIG. 22 shows the freedom to which the angle of the keyboards could be operated. Left keyboard 150 and right keyboard 158 pivot from a closed position over the display to an open position from pivots 141 and 159. Keyboard supports 157 and 151 are integral to computer 153 to set the full open position of keyboards 150 and 158. Keyboard supports 157 and 151 restrain motion of keyboards 150 and 158 so they can be easily flipped open and be self supporting without other means for support. Notch 161 can be designed to set the angle of and where keyboards 150 and 158 contact supports 157 an 151. Supports 157 and 151 could also be adjustable so an operator could define at what position is most comfortable.

When a defined point at which the angle of the keyboards 150 and 158 are subject to change by different operators, various detents can be used to hold the keyboards 150 and 158 at any angle from the closed to an open position. One such detent is friction point 156 in FIG. 21. This type of detent gives an infinite degree of angle restraint for the keyboards. Friction point 156 can be molded in with a given interference that lets keyboards 150 and 158 when sliding against computer processor 153 cause friction, or a dissimilar material or wave type washer can be inserted to cause friction at friction point 156. This friction is what actually restrains the movement of the keyboard to hold, or detent, the keyboards in the position that an operator positions the keyboards. The actual amount of friction that is needed is small because it only needs to be enough to overcome the force of a keyboard key spring, or about two ounces.

Figure 24:
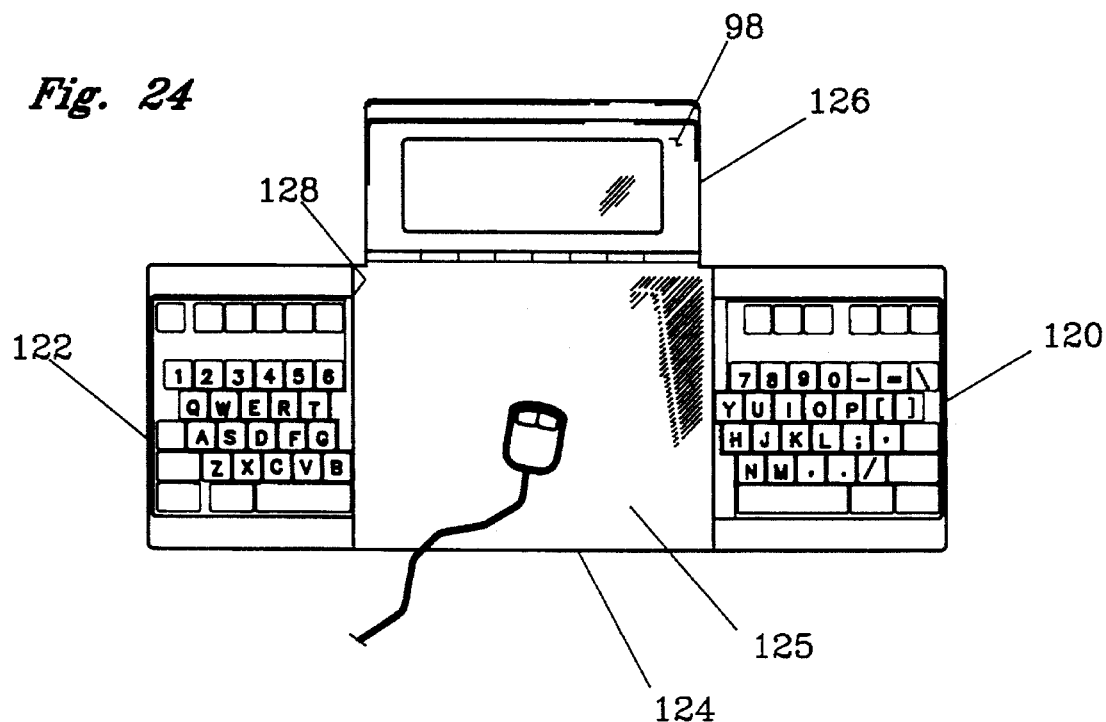
FIG. 24 is a plan view of a computer and hinged display with material holder, the keyboard that rotates to an open position and showing a pointing device on the activity surface in accordance with the teachings of this invention.
Figure 25:
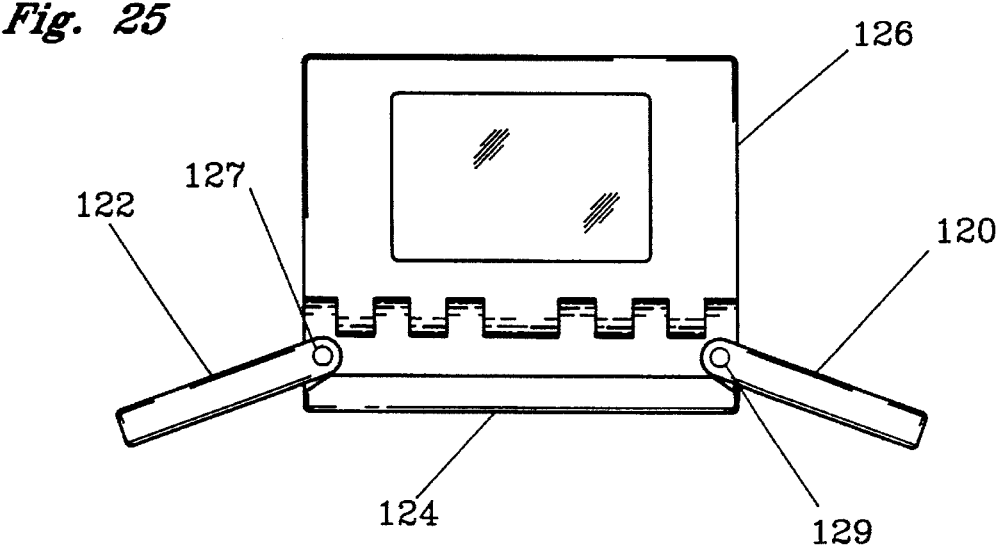
FIG. 25 is a front view of a computer and hinged display with the keyboards detented in different angle positions in accordance with the teachings of this invention.
Figure 26:
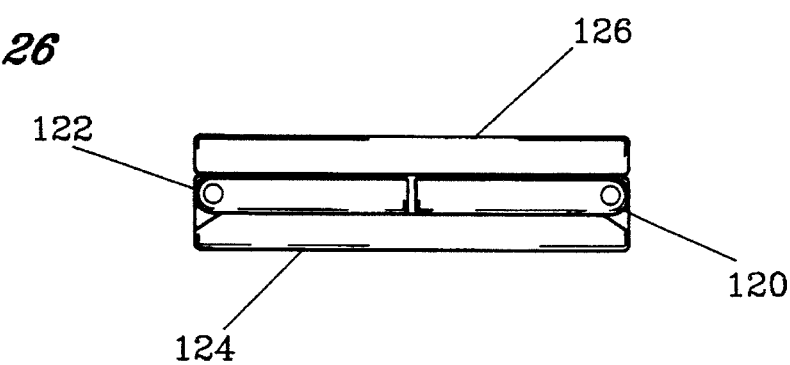
FIG. 26 is a front view of a computer and hinged display with the keyboards in the closed position in accordance with the teachings of this invention.

FIG. 24 shows a computer processor 124 with a left keyboard 122 and right keyboard 120 in an open position. The front face 98 of display 126 can be used as a material holder to support documents when inputting data. The keyboards pivot from an open to a closed position from pivots 127 and 129 in FIG. 25. The display 126 can fold over keyboards 120 and 122 in the closed position as shown in FIG. 26. The top of computer processor 124 forms a substantially flat surface 125 between the keyboards for hand writing, a pointing device or other functions that could be preformed in that area. This area for the most part is free of switches, holes or other features that would deter from use of the flat surface. This is not to say that switches could not be around the periphery of this area or that membrane switches or other like switches could not be in this surface. FIG. 24 shows left keyboard 122 and right keyboard 120 and display 126 in an open position. Friction point 128, like friction point 156 in FIG. 21, can detent the left and right keyboards in an infinite degree of angular adjustment. FIG. 25 shows left keyboard 122 and right keyboard 120 in a position below a horizontal plane where the tops of the keyboards would be parallel. This position would be advantageous when holding the computer on an operators lap because the lower sides of the keyboards would be in contact with the operators legs and would centralize the computer over the lap and the attitude of the keys would also relieve some of the twist between the hand and wrist. FIG. 26 shows a front view of computer processor 124 with right keyboard 120 and left keyboard 122 and display 126 in a closed position.

Figure 27:
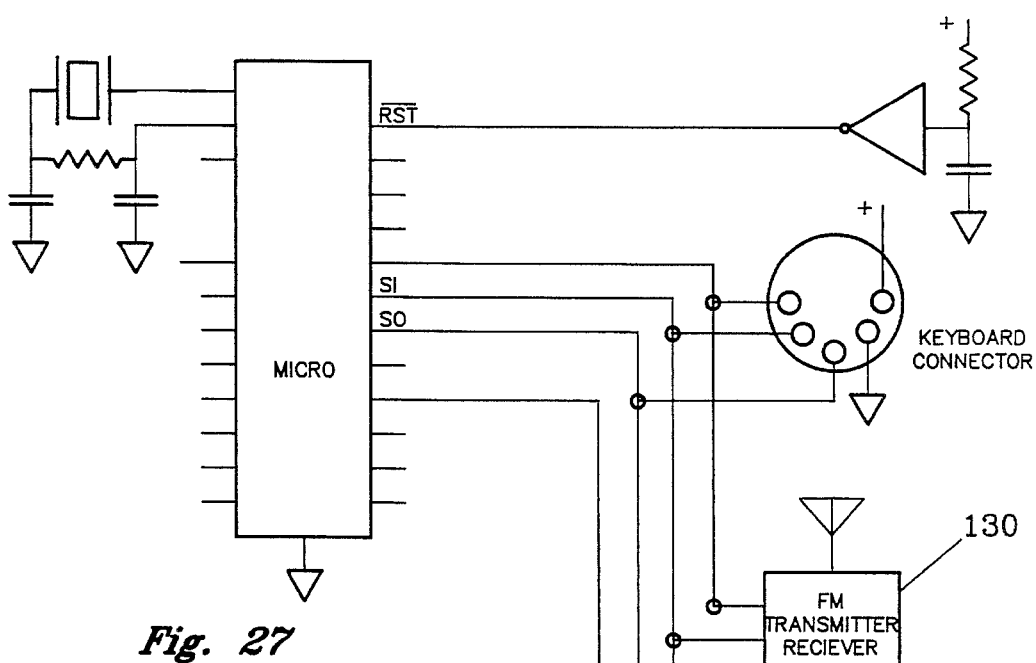
FIG. 27 shows the FM transmitter and receiver and speaker in accordance with the teachings of this invention.

FIG. 27 shows the micro in the keyboard with FM transmitter and receiver 130 for communicating with a host computer with radio frequency signals. Speaker circuit 132 and speaker 134 let the operator receive enunciated audible verbal responses from the host or keyboard entry.

Figure 28:
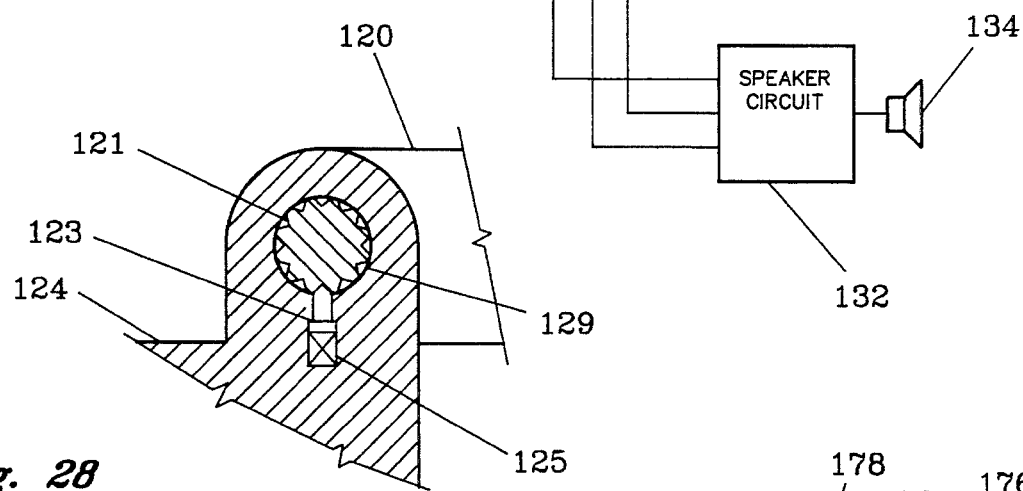
FIG. 28 is a section view showing one type of detent mechanism for holding the keyboards at different angle positions in accordance with the teachings of this invention.
Figure 29:
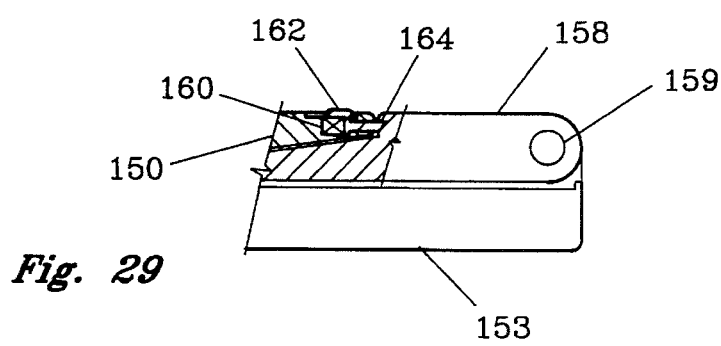
FIG. 29 is a section view showing one type of detent mechanism for holding the keyboards at different angle positions in accordance with the teachings of this invention.
Figure 30:
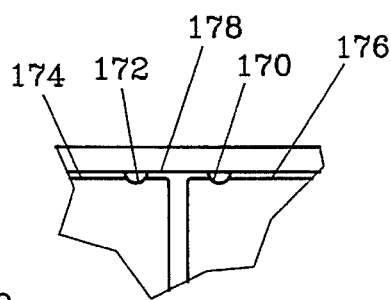
FIG. 30 is a view showing one type of detent mechanism for holding the keyboard at a position in accordance with the teachings of this invention.

FIG. 28 shows another detent mechanism that can be used in place of, or with, friction point 156 in FIG. 21 or 128 in FIG. 24. Pivot 129 in computer housing 124 allows keyboard 120 rotate. Spring 125 applies pressure on detent pin 123 that detents the position of keyboard 120 at various angles defined by notches 121 that are attached to keyboard 120. FIG. 29 shows another detent mechanism that can be used with or without the friction point 156 in FIG. 21 or 128 in FIG. 24. Computer processor 153 retains pivot 159 in which right keyboard 158 rotates. Spring 160 applies pressure on pin 164 that is attached to button 162. Pin 164 slides in left keyboard 150 and engages right keyboard 158. Button 162 is used to disengage pin 164 from right keyboard 158. FIG. 30 shows another detent mechanism in which the surface of the keyboard that is in track 178 is notched to allow the detent fingers 170 and 172 to engage keyboards 174 and 176. Detent fingers 170 and 172 deflect until they engage recesses in keyboards 174 and 176.

The invention as described in the preferred embodiment has been described with only a left side and a right side keyboard. It is obvious to those skilled in the art that: different groups of keys forming a keyboard could be used; only one side of the keyboard could be fitted; or, a pointing device used on a side in conjunction with keys and with keys on the other side of the keyboard.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters, said left hand set being housed in a left housing;

a right hand set of alpha keys for entering said second plurality of alpha characters, said right hand set being housed in a right housing;

a flat planar surface forming a top surface of a structure separating said left hand set of alpha keys and said right hand set of alpha keys, said structure spanning substantially from front to rear of said keyboard, said left and right housing forming left and right keyboard, respectively, said structure connecting said left and right housings to maintain alignment between said left and right housings; and 2. A keyboard as claimed in claim 1, further including a speaker that a keyboard operator can receive enunciated audible verbal responses for a key entry or computer transmitted message.

3. A keyboard as claimed in claim 1, further comprising in combination:

a speaker that a keyboard operator can receive enunciated audible verbal responses for a key entry or computer transmitted message; and means to turn off a computer display and lights associated with said keyboard or a computer connected to said keyboard during operation of said computer.

4. A keyboard as claimed in claim 1, further comprising means for generating, and means for transmitting and receiving data by radio frequency signals responsive to said keyboard.

5. A keyboard as claimed in claim 1, further comprising in combination:

a computer processor housed in said structure between said left and right keyboards, and wherein said keyboards are moveable from a closed position that is over said flat planar surface, to an open position that exposes said flat planar surface; and a display disposed on said reference material holder.

6. A keyboard as claimed in claim 5, wherein at least one of said keyboards is slidable.

7. A keyboard as claimed in claim 5, wherein said left keyboard is rotatably supported from a pivot;

said right keyboard is rotatably supported from a pivot; and said left keyboard rotates from said open position toward said right keyboard and said right keyboard rotates from said open position toward said left keyboard to said closed position over said computer processor.

8. A keyboard as claimed in claim 5, wherein said left side keyboard is rotatably supported and has a first maximum thickness from a top to a bottom of said left side keyboard;

said right side keyboard is rotatably supported and has a second maximum thickness from a top to a bottom of said right side keyboard;

said left side keyboard rotates from said open position toward said right side keyboard and said right side keyboard rotates from said open position toward said left side keyboard to an interleaving position; and said interleaving position is formed when a first of said left and right side keyboards is notched to a configuration to receive a second of said left and right side keyboards so as to overlap, the cumulative thickness at said overlap is less than the sum of said first and second maximum thicknesses.

9. A keyboard as claimed in claim 5, wherein said display is sensitive to a persons finger or stylus for inputting data to said computer processor.

10. A keyboard as claimed in claim 1, further including in combination:

a computer processor housed in said structure between said left and right keyboards; and a display, to display data from said computer processor and said left and right keyboards, disposed on said flat planar surface.

11. A keyboard as claimed in claim 10, further including said keyboards are moveable from a closed position, that is over said flat planar surface and said display, to an open position, that exposes said flat planar surface and said display; and at least one of said left and right keyboards are slidable.

12. A keyboard as claimed in claim 10, wherein said keyboards are moveable from a closed position, that is over said flat planar surface and said display, to an open position, that exposes said flat planar surface and said display;

said left keyboard is rotatably supported from a pivot;

said right keyboard is rotatably supported from a pivot; and said left keyboard rotates from said open position toward said right keyboard and said right keyboard rotates from said open position toward said left keyboard to said closed position.

13. A keyboard as claimed in claim 10, wherein said keyboards are moveable from a closed position, that is over said flat planar surface and said display, to an open position, that exposes said flat planar surface and said display;

said left side keyboard is rotatably supported and has a first maximum thickness from a top to a bottom of said left side keyboard;

said right side keyboard is rotatably supported and has a second maximum thickness from a top to a bottom of said right side keyboard;

said left side keyboard rotates from said open position toward said right side keyboard and said right side keyboard rotates from said open position toward said left side keyboard to an interleaving position; and said interleaving position is formed when a first of said left and right side keyboards is notched to a configuration to receive a second of said left and right side keyboards so as to overlap, the cumulative thickness at said overlap is less than the sum of said first and second maximum thicknesses.

14. A keyboard as claimed in claim 10, wherein the active surface of said integral display is narrower in the X dimension than in the Y dimension.

15. A keyboard as claimed in claim 10, wherein said display is sensitive to a persons finger or a stylus for inputting data.

16. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters;

a right hand set of alpha keys for entering said second plurality of alpha characters;

said left and right hand sets of alpha keys moveable on interconnecting front and rear support members towards a closed position where said left and right hand sets of alpha keys are one contiguous set of alpha keys and in an opposing direction where said left and right hand sets of alpha keys can be in a separated position exposing said support members;

said left and right sets of alpha keys are housed in a left and right housing, respectively, forming left and right keyboards;

an activity area support rotatably mounted and integral with said rear support member that moves from an open position to a closed position, said open position being perpendicular to said rear support member, said closed position being nested in said rear support enabling said activity area support to remain attached when said keyboard is in said closed position; and said keyboard is operable in said separated position with said activity area support in both said open position and said closed position.

17. A keyboard as claimed in claim 16, further including a speaker that a keyboard operator can receive enunciated audible verbal responses for a key entry or computer transmitted message.

18. A keyboard as claimed in claim 16, further comprising in combination:

a speaker that a keyboard operator can receive enunciated audible verbal responses for a key entry or computer transmitted message; and means to turn off a computer display and lights associated with said keyboard or a computer connected to said keyboard during operation of said computer.

19. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters, said left hand set being housed in a left housing;

a right hand set of alpha keys for entering said second plurality of alpha characters, said right hand set being housed in a right housing, said left and right hand sets of alpha keys being moveable on interconnecting front and rear support members towards a closed position where said left and right hand sets of alpha keys are one contiguous set of alpha keys and in an opposing direction where said left and right hand sets of alpha keys can be in a separated position exposing said support members; and a reference material holder rotatably mounted and integral with said rear support member that moves from an open position to a closed position, said reference material holder open position being vertical to a longitudinal axis of said keyboard, said reference material holder closed position being nested in said rear support member enabling said reference material holder to remain attached when said keyboard is in said closed position, said keyboard is operable in said closed position and said keyboard is operable in said separated position with said reference material holder in both said open position and said closed position.

20. A keyboard as claimed in claim 19, further including a speaker that a keyboard operator can receive enunciated audible verbal responses for a key entry or computer transmitted message.

21. A keyboard as claimed in claim 19, further comprising in combination:

a speaker that a keyboard operator can receive enunciated audible verbal responses for a key entry or computer transmitted message; and means to turn off a computer display and lights associated with said keyboard or a computer connected to said keyboard during operation of said computer.

22. A stand alone keyboard where the keys are split and separable so a first plurality of alpha characters can be entered with a left hand separated from a second plurality of alpha characteres entered with a right hand, said keyboard comprising in combination:

a left hand set of alpha keys for entering said first plurality of alpha characters, said left hand set of alpha keys being housed in a left housing;

a right hand set of alpha keys for entering said second plurality of alpha characters, said right hand set of alpha keys being housed in a right housing;

a flat surface forming a top surface of a structure separating said left hand set of alpha keys and said right hand set of alpha keys, said structure spanning substantially from front to rear of said keyboard said left and right housing forming left and right keyboard, respectively, said structure connecting said left and right housings to maintain alignment between said left and right housings;

a computer processor housed in said structure between said left and right keyboards;

a display disposed on said flat surface, wherein said left and right sets of alpha keys are moveable from a closed position that is over said flat planar surface and said display, to an open position that exposes said flat surface and said displays and wherein at least one of said left and said right sets of alpha keys are slidable; and a detent mechanism which interacts with said structure and at least one of said left and right housings for restraining movement of said at least one of said left and right housings, said detent mechanism at least restraining movement when said left and right sets of alpha keys are in said closed position.

23. A keyboard as claimed in claim 22, further including a speaker that a keyboard operator can receive enunciated audible verbal responses for a key entry or computer transmitted message.

24. A keyboard as claimed in claim 22, further comprising a means to turn off said display and lights associated with said keyboard and or said computer processor during operation of said computer processor.

25. A keyboard as claimed in claim 22, further comprising a speaker that a keyboard operator can receive enunciated audible verbal response for a key entry or computer transmitted message; and a means to turn off said display and lights associated with said keyboard or said computer processor during operation of said computer processor.

26. A keyboard as claimed in claim 22, wherein said display is narrower in the X dimension than in the Y dimension.

27. A keyboard as claimed in claim 22, wherein said display is sensitive to a persons finger or stylus for inputting data to said computer processor.

28. A keyboard as claimed in claim 22, wherein said detent mechanism comprises a plurality of detents which interact with and restrain movement of said at least one of said left and right sets of alpha keys that is slidable at a plurality of positions.

29. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters, said left hand set of alpha keys being housed in a left housing;

a right hand set of alpha keys for entering said second plurality of alpha characters, said right hand set of alpha keys being housed in a right housing;

a flat surface forming a top surface of a structure separating said left hand set of alpha keys and said right hand set of alpha keys, said structure spanning substantially from front to rear of said keyboard, said left and right housing forming left and right keyboard, respectively, said structure connecting said left and right housings to maintain alignment between said left and right housings;

a computer processor housed in said structure between said left and right keyboards;

a display disposed on said flat surface, wherein said left housing is rotatably supported from a left pivot and said right housing is supported from a right pivot, and wherein said left and right housings rotate from a closed position that is over said flat surface and said display, to an open position that exposes said flat surface and said display with said left and right housings rotating towards each other to said closed position and away from each other to said open position;

a detent mechanism which interacts with said structure and at least one of said left and right housings for restraining movement of said at least one of said left and right housings, said detent mechanism at least restraining movement when said left and right sets of alpha keys are in said closed position; and said left and right housing support integral to said structure to position said left and right housings at an angle of rotation to define a full open position.

30. A keyboard as claimed in claim 29, wherein a horizontal plane is defined when said left and right housings are rotated toward said open position until a top of both said left and right housings are parallel and wherein said left and right housing support stops rotation of said left and right housings at an angle of rotation greater than said horizontal plane.

31. A keyboard as claimed in claim 29, wherein said left housing has a first maximum thickness from a top to a bottom of said left housing, said right housing has a second maximum thickness from a top to a bottom of said right housing, and wherein said left housing interleaves with said right housing when said left and right housings are in the closed position, said interleaving is achieved when a first of said left and right housings is notched to a configuration to receive a second of said left and right housings so as to overlap, and wherein the cumulative thickness at said overlap is less than a sum of said first and second maximum thicknesses.

32. A keyboard as claimed in claim 29, further including a speaker that a keyboard operator can receive enunciated audible verbal responses for a key entry or computer transmitted message.

33. A keyboard as claimed in claim 29, further comprising in combination a means to turn off said display during operation of said computer processor.

34. A keyboard as claimed in claim 29, further comprising in combination:

a speaker that a keyboard operator can receive enunciated audible verbal responses for a key entry or computer transmitted message; and means to turn off said display and lights associated with said keyboard or said computer processor during operation of said computer processor.

35. A keyboard as claimed in claim 29, wherein
said display is narrower in the X dimension than in the Y dimension.

36. A keyboard as claimed in claim 29, wherein
said display is sensitive to a persons finger or stylus for inputting data to said computer processor.

37. A keyboard as claimed in claim 29, wherein said detent mechanism comprises a plurality of detents positioned between said right housing and said right pivot and between said left housing and left pivot which interact with and restrain rotational movement of said left and right housings on said left and right pivots, respectively, at a plurality of positions.

38. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters, said left hand set of alpha keys being housed in a left housing;

a right hand set of alpha keys for entering said second plurality of alpha characters, said right hand set of alpha keys being housed in a right housing;

a flat surface forming a top surface of a structure separating said left hand set of alpha keys and said right hand set of alpha keys, said structure spanning substantially from front to rear of said keyboard, said left and right housing forming left and right keyboard, respectively, said structure connecting said left and right housings to maintain alignment between said left and right housings;

a computer processor housed in said structure between said left and right keyboards, wherein said left housing is rotatably supported from a left pivot and said right housing is supported from a right pivot, and wherein said left and right housings rotate from a closed position that is over said flat surface and said display, to an open position that exposes said flat surface with said left and right housings rotating towards each other to said closed position and away from each other to said open position;

a detent mechanism which interacts with said structure and at least one of said left and right housings for restraining movement of said at least one of said left and right housings, said detent mechanism at least restraining movement when said left and right sets of alpha keys are in said closed position;

said left and right housing support integral to said structure to position said left and right housings at an angle of rotation to define a full open position; and a display rotatably disposed on said rear of said structure on an axis parallel to a longitudinal axis of said keyboard, said display moves in an arc which is perpendicular to said longitudinal axis of said keyboard from a closed position over said left and right housings when said left and right housings are in said closed position to an open position where said display is at least perpendicular to said structure.

39. A keyboard as claimed in claim 38, wherein a horizontal plane is defined when said left and right housings are rotated toward said open position until a top of both said left and right housings are parallel and wherein said left and right housing support stops rotation of said left and right housings at an angle of rotation greater than said horizontal plane.

40. A keyboard as claimed in claim 38, further including
a speaker that a keyboard operator can receive enunciated audible verbal responses for a key entry or computer transmitted message.

41. A keyboard as claimed in claim 36, further comprising a means to turn off said display and lights associated with said keyboard or said computer processor during operation of said computer processor.

42. A keyboard as claimed in claim 38, further comprising in combination:

a speaker that a keyboard operator can receive enunciated audible verbal responses for a key entry or computer transmitted message; and means to turn off said display and lights associated with said keyboard or said computer processor during operation of said computer processor.

43. A keyboard as claimed in claim 38, wherein
said display is sensitive to a persons finger or stylus for inputting data to said computer processor.

44. A keyboard as claimed in claim 38, wherein said detent mechanism comprises a plurality of detents positioned between said right housing and said right pivot and between said left housing and left pivot which interact with and restrain rotational movement of said left and right housings on said left and right pivots, respectively, at a plurality of positions.

45. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters, said left hand set of alpha keys being housed in a left housing;

a right hand set of alpha keys for entering said second plurality of alpha characters, said right hand set of alpha keys being housed in a right housing;

a flat surface forming a top surface of a structure separating said left hand set of alpha keys and said right hand set of alpha keys, said structure spanning substantially from front to rear of said keyboard, said left and right housing forming left and right keyboard, respectively, said structure connecting said left and right housings to maintain alignment between said left and right housing;

a computer processor housed in said structure between said left and right keyboards, wherein said left and right sets of alpha keys are moveable from a closed position that is over said flat surface, to an open position that exposes said flat surface, and wherein at least one of said left and said right sets of alpha keys are slidable;

a detent mechanism which interacts with said structure and at least one of said left and right housings for restraining movement of said at least one of said left and right housings, said detent mechanism at least restraining movement when said left and right sets of alpha keys are in said closed position; and a display rotatably disposed on said rear of said structure on an axis parallel to a longitudinal axis of said keyboard, said display moves in an arc which is perpendicular to said longitudinal axis of said keyboard from a closed position over said left and right sets of alpha keys when said left and right sets of alpha keys are in said closed position, to an open position where said display is at least perpendicular to said structure.

46. A keyboard as claimed in claim 45, further including
  a speaker that a keyboard operator can receive enunciated audible verbal responses for a key entry or computer transmitted message.

47. A keyboard as claimed in claim 45, further comprising in combination a means to turn off said display and lights associated with said keyboard or said computer processor during operation of said computer processor.

48. A keyboard as claimed in claim 45, further comprising in combination:
  a speaker that a keyboard operator can receive enunciated audible verbal responses for a key entry or computer transmitted message; and
  means to turn off said display and lights associated with said computer processor during operation of said computer processor.

49. A keyboard as claimed in claim 45, wherein
  said display is sensitive to a persons finger or stylus for inputting data to said computer processor.

50. A keyboard as claimed in claim 45, wherein said detent mechanism comprises a plurality of detents which interact with and restrain movement of said at least one of said left and right sets of alpha keys that is slidable at a plurality of positions.

* * * * *

UNITED STATES PATENT AND TRADEMARK OFFICE
CERTIFICATE OF CORRECTION

PATENT NO. : 5,502,460

DATED : March 26, 1996

INVENTOR(S) : James H. Bowen

It is certified that error appears in the above-indentified patent and that said Letters Patent is hereby corrected as shown below:

In column 9, at line 51, claim 1 should read:

1. A stand alone keyboard where the keys are split and separable so a first plurality of alpha characters can be entered with a left hand separated from a second plurality of alpha characters entered with a right hand, said keyboard comprising in combination:

a left hand set of alpha keys for entering said first plurality of alpha characters, said left hand set being housed in a left housing;

a right hand set alpha keys for entering said second plurality of alpha characters, said right hand set being housed in a right housing;

a flat planar surface forming a top surface of a structure separating said left hand set of alpha keys, and said right hand set of alpha keys said structure spanning substantially from front to rear of said keyboard;

said left and right housings forming left and right keyboards, respectively;

said structure connecting said left and right housings to maintain alignment between said left and right housings; and a reference material holder disposed on said structure mounted from a fulcrum with an axis parallel to a longitudinal axis of said keyboard, said reference material holder moves in an arc which is perpendicular to said longitudinal axis of said keyboard from said fulcrum between a closed position near said flat planar surface to an open position.

UNITED STATES PATENT AND TRADEMARK OFFICE
CERTIFICATE OF CORRECTION

PATENT NO. : 5,502,460
DATED : March 26, 1996
INVENTOR(S) : James H. Bowen

It is certified that error appears in the above-indentified patent and that said Letters Patent is hereby corrected as shown below:

In column 16, at line 5, following "claim", "36" should be deleted and "38" inserted.

Signed and Sealed this

Twenty-fourth Day of September, 1996

Attest:

BRUCE LEHMAN

*Attesting Officer*  *Commissioner of Patents and Trademarks*